(12) United States Patent
Amano

(10) Patent No.: US 7,312,922 B2
(45) Date of Patent: Dec. 25, 2007

(54) CONFOCAL MICROSCOPE

(75) Inventor: Yusuke Amano, Hachioji (JP)

(73) Assignee: Olympus Corporation, Tokyo (JP)

( * ) Notice: Subject to any disclaimer, the term of this patent is extended or adjusted under 35 U.S.C. 154(b) by 326 days.

(21) Appl. No.: 10/881,683

(22) Filed: Jun. 29, 2004

(65) Prior Publication Data
US 2005/0002091 A1 Jan. 6, 2005

(30) Foreign Application Priority Data
Jul. 3, 2003 (JP) ............... 2003-191391

(51) Int. Cl.
G02B 21/06 (2006.01)
(52) U.S. Cl. .................... 359/388; 359/234
(58) Field of Classification Search ........... 359/388
See application file for complete search history.

(56) References Cited

U.S. PATENT DOCUMENTS 6,157,484 A * 12/2000 Nishida ............... 359/434
6,285,651 B1 * 9/2001 Boutaghou et al. ......... 720/721
2002/0097490 A1 * 7/2002 Endo et al. ............... 359/388

FOREIGN PATENT DOCUMENTS

JP 5-75719 U 10/1993
JP 2000-275542 A 10/2000

* cited by examiner

Primary Examiner—Stephone B. Allen
Assistant Examiner—Derek S. Chapel
(74) Attorney, Agent, or Firm—Frishauf, Holtz, Goodman & Chick, P.C.

(57) ABSTRACT

A disk unit for a confocal microscope has a rotary disk having many confocal openings, a rotary drive portion, which rotates the rotary disk, a holding member, which holds the rotary disk and the rotary drive portion, a drive portion, which is allowed to insert into and remove from an optical axis the rotary disk, and a disk replacement mechanism, which allows the rotary disk to be attached to and detached from the rotary drive portion.

13 Claims, 12 Drawing Sheets

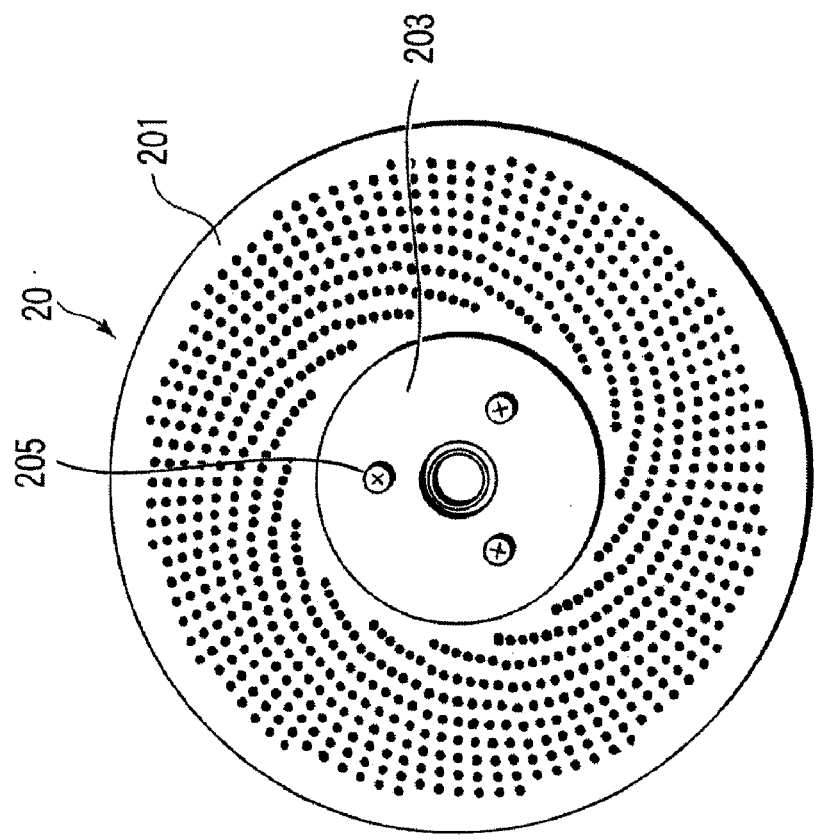
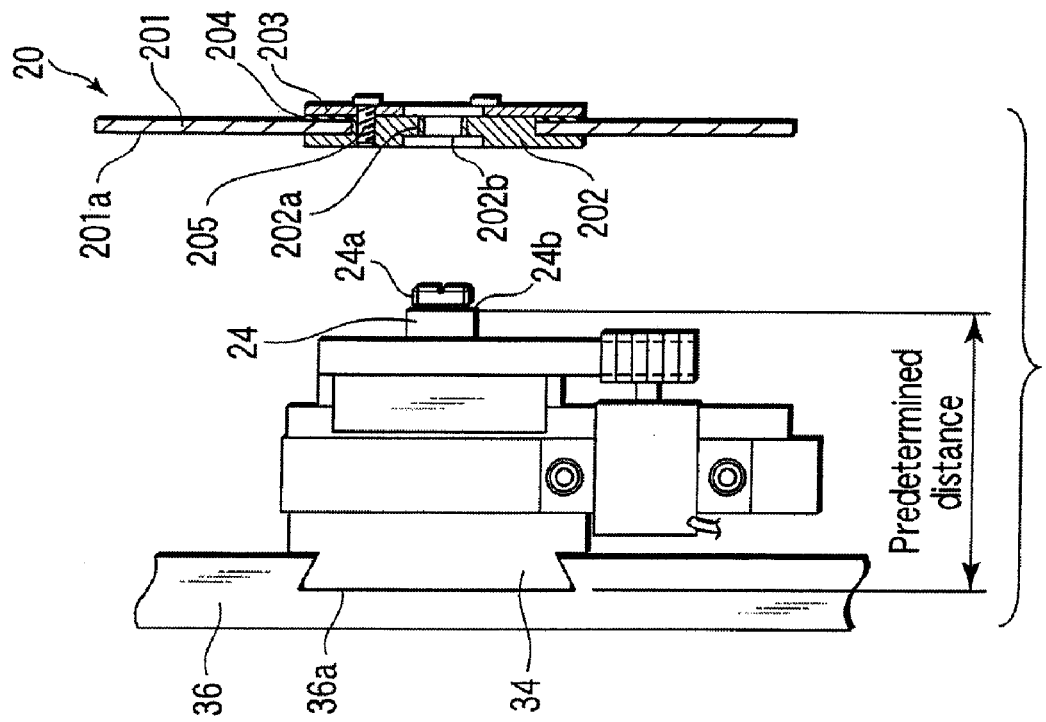
FIG. 2B
FIG. 2A

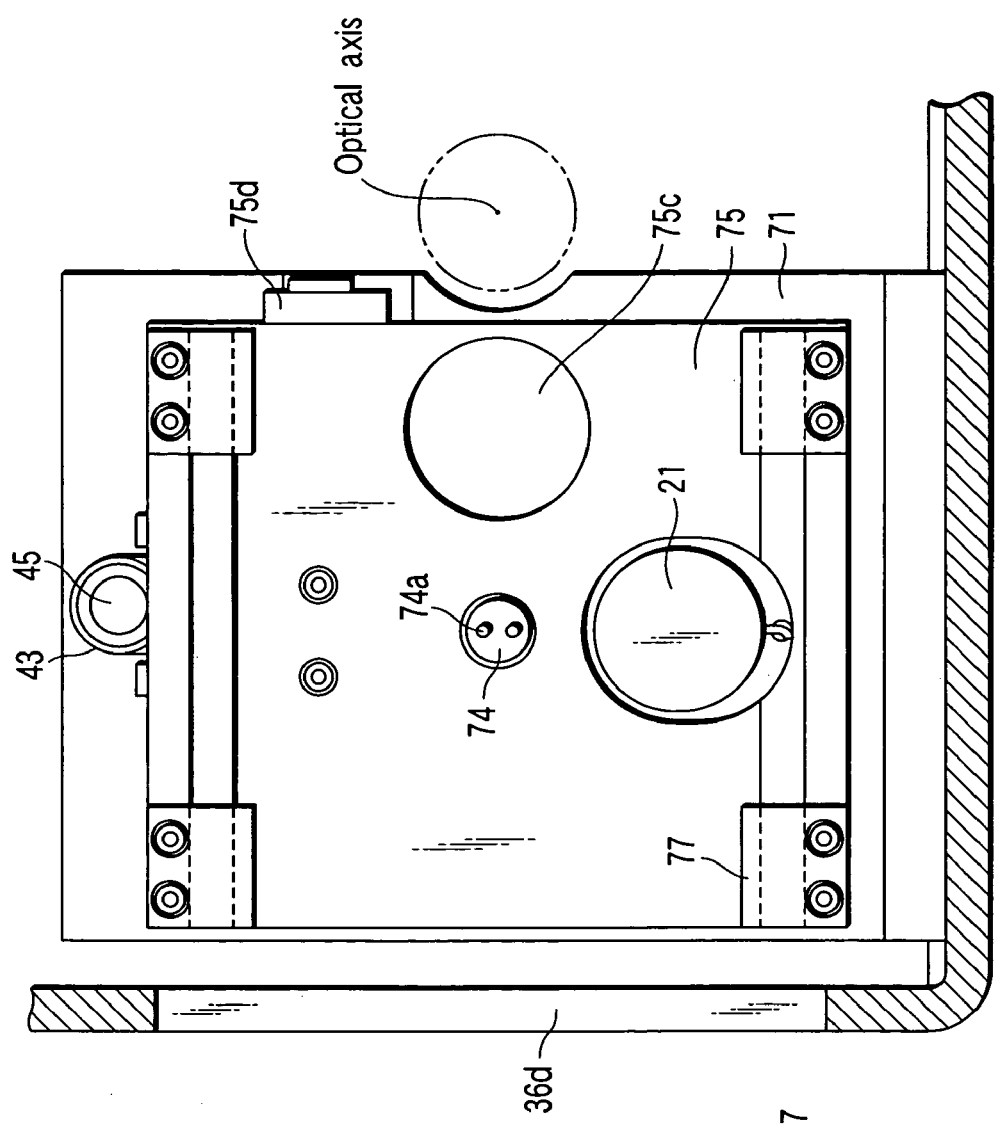
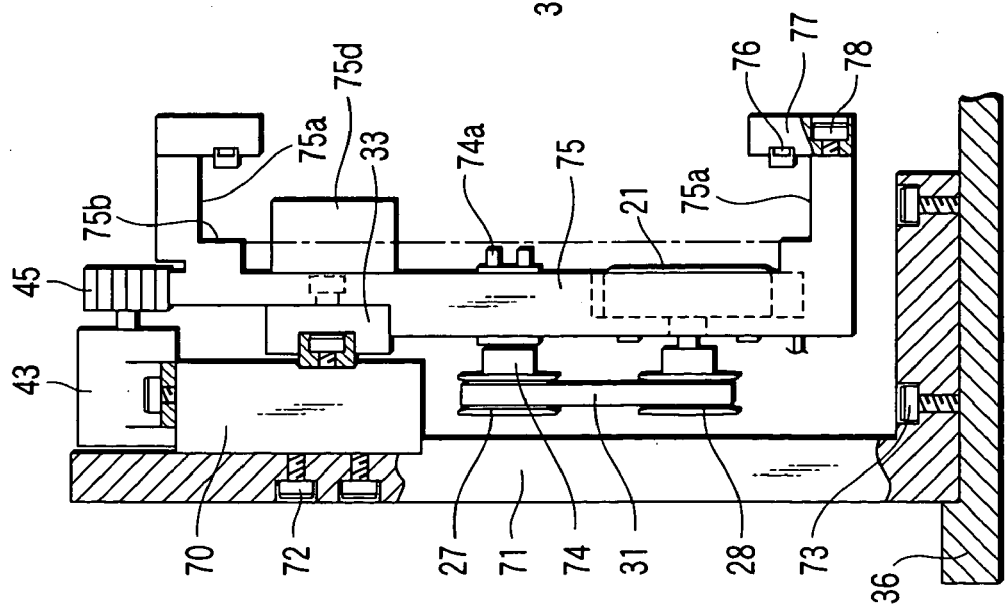
FIG. 8B
FIG. 8A

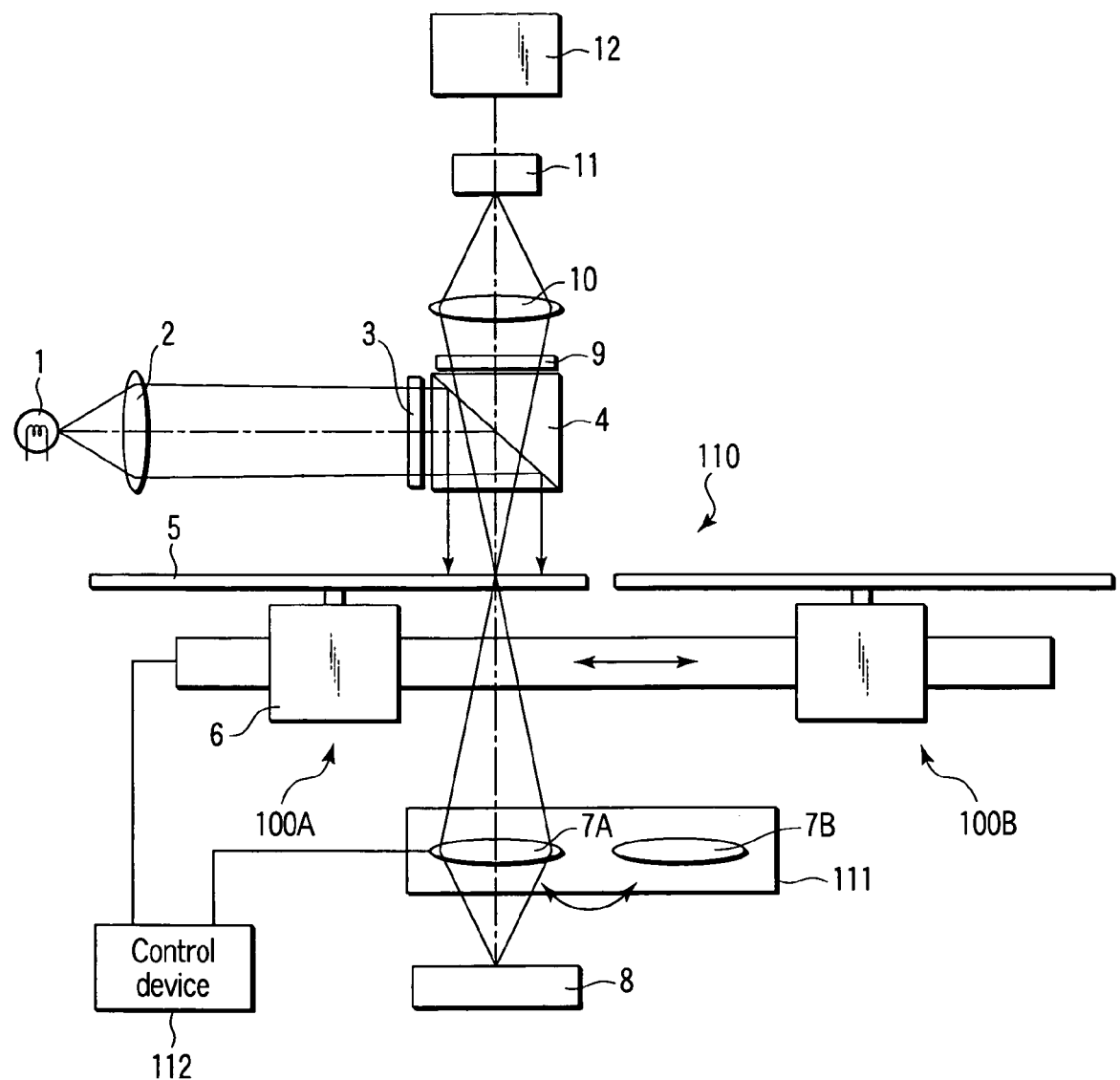
F I G. 12

CONFOCAL MICROSCOPE

CROSS-REFERENCE TO RELATED APPLICATIONS

This application is based upon and claims the benefit of priority from prior Japanese Patent Application No. 2003-191391, filed Jul. 3, 2003, the entire contents of which are incorporated herein by reference.

BACKGROUND OF THE INVENTION

1. Field of the Invention

The present invention relates to a disk scanning type confocal microscope, which performs confocal observation with respect to a sample.

2. Description of the Related Art

FIG. 13 shows a structure of a conventional example of a disk scanning type confocal microscope. In FIG. 13, light from a light source 1 such as a mercury light source is transmitted through a lens 2 and an excitation filter 3, reflected by a dichroic mirror 4, and then applied onto a rotary disk 5, which is located at an intermediate image position conjugate with a sample surface.

The rotary disk 5 has confocal openings, and is rotated at a fixed speed by a motor 6. The light transmitted though the confocal openings of the rotary disk 5 is applied onto a sample 8 through an objective lens 7. Fluorescence emitted from the sample 8 is likewise transmitted through the objective lens 7 and the confocal openings of the rotary disk 5, and focused onto a CCD camera 11 by an image formation lens 10 through the dichroic mirror 4 and an absorption filter 9. At this time, since only the light transmitted through the confocal openings is focused onto the CCD camera, a confocal image, which is sharp-edged in a cross-sectional direction, is obtained on a monitor 12.

Further, the rotary disk can be generally arbitrarily inserted into/removed from an optical path by moving means, not shown, and confocal observation and normal observation are switched in accordance with insertion/removal of the rotary disk.

The confocal effect depends on a ratio of a light beam diameter and an opening diameter. Since the light beam diameter is represented by 1.22 $\lambda$/NA ($\lambda$: light source wavelength, NA: numerical aperture), the confocal effect depends on NA of the objective lens. Therefore, when the objective lens is changed to one with a different NA with respect to the same confocal openings, the confocal effect is also changed.

For this reason, in the confocal microscope, the confocal opening must have a size matching with (i.e., suitable for) of the NA (numerical aperture) of the objective lens to be used for the preferable observation, i.e., in order to obtain the same confocal image irrespective of the NA of the objective lens. Therefore, in the disk scanning type confocal microscope, the rotary disk has the confocal openings whose size is appropriate for the NA (numerical aperture) of the objective lens to be used.

Jpn. UM Appln. KOKAI Publication No. 5-75719 discloses a structure in which the confocal effect is changed by varying the NA of light entering the confocal openings on a rotary disk by a relay lens.

Jpn. Pat. Appln. KOKAI Publication No. 2000-275542 discloses a structure in which a disk has confocal opening patterns, which respectively correspond to objective lenses and arranged in a circumferential direction on the disk, and a CCD camera is caused to perform imaging in synchronization at the time of scanning in each area.

It is to be noted that the description has been given as to the disk scanning type confocal microscope for fluorescence observation as the prior art, but the same description can be applied to a disk scanning type confocal microscope adopting a polarization mode, which is constituted by substituting a polarizing beam splitter for three components, i.e., the excitation filter 3, the dichroic mirror 4, and the absorption filter 9, and arranging a quarter wave plate between the polarizing beam splitter and the objective lens 7.

BRIEF SUMMARY OF THE INVENTION

According to an aspect, the present invention is directed to a confocal microscope. The confocal microscope according to the present invention includes a disk unit. The disk unit comprises a rotary disk, which is located at a position conjugate with a sample surface and has confocal openings, a rotary drive portion, which rotates the rotary disk, a holding member, which holds the rotary disk and the rotary drive portion, a drive portion, which is allowed to insert into and remove from an optical axis the rotary disk, and a disk replacement mechanism, which allows the rotary disk to be attached to and detached from the rotary drive portion. The confocal microscope further comprises an illumination optical system, which applies illumination light to a sample through the confocal openings of the rotary disk, an image formation optical system, which focuses the light from the sample through the confocal openings of the rotary disk, and an imaging device, which images a confocal image formed by the image formation optical system.

According to another aspect, the present invention is directed to a disk unit. The disk unit according to the present invention comprises a rotary disk having confocal openings, a rotary drive portion, which rotates the rotary disk, a holding member, which holds the rotary disk and the rotary drive portion, a drive portion, which is allowed to insert into and remove from an optical axis the rotary disk, and a disk replacement mechanism, which allows the rotary disk to be attached to and detached from the rotary drive portion.

According to another aspect, the present invention is directed to a disk unit switching device for a confocal microscope. The disk unit switching device includes disk units. Each disk unit comprises a rotary disk having confocal openings, a rotary drive portion, which rotates the rotary disk, a holding member, which holds the rotary disk and the rotary drive portion, a drive portion, which is allowed to insert into and remove from an optical axis the rotary disk, and a disk replacement mechanism, which allows the rotary disk to be attached to and detached from the rotary drive portion. Further, the disk unit switching device has a switching mechanism, which switches the disk units to apply one of the disk units to the confocal microscope.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a top view of the disk unit depicted in FIGS. 1A and 1B, showing a state in which a rotary disk is removed;

FIG. 2B is a front view of the rotary disk depicted in FIG. 2A;

FIG. 8A is a side view of a disk unit for the disk cartridge illustrated in FIGS. 7A, 7B and 7C;

FIG. 8B is a front view of the disk unit depicted in FIG. 8A;

FIG. 12 schematically shows a structure of a confocal microscope including the disk unit switching device according to the fourth embodiment of the present invention.

DETAILED DESCRIPTION OF THE INVENTION

Embodiments according to the present invention will now be described hereinafter with reference to the accompanying drawings.

First Embodiment

Figure 1A:
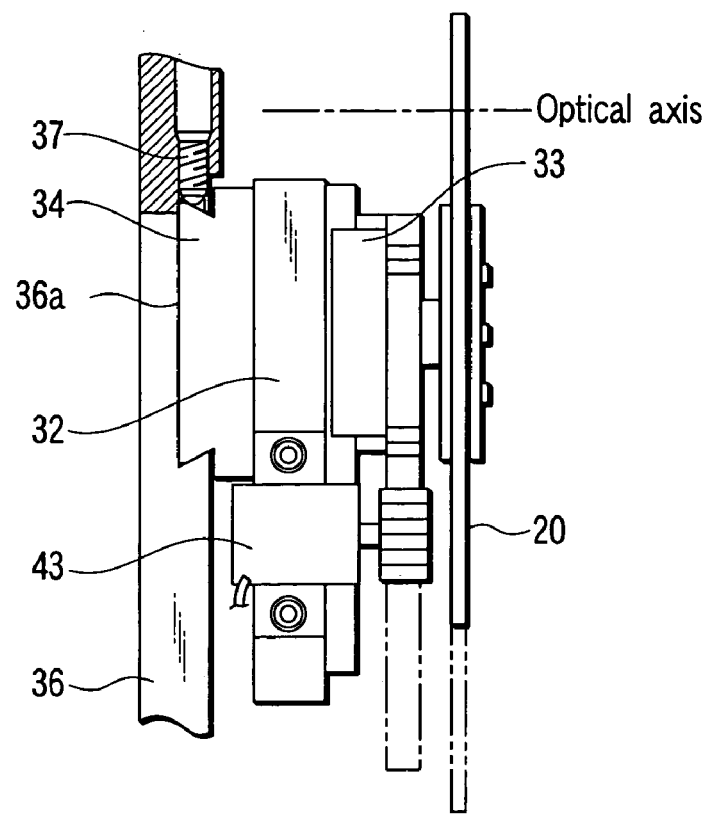
FIG. 1A is a top view of a disk unit according to a first embodiment of the present invention.

This embodiment is directed to a disk unit of a confocal microscope. In this specification, the disk unit is a generic term of parts concerning rotation of a rotary disk, insertion into and removal from an optical path the rotary disk, and replacement of the rotary disk. FIG. 1A is a top view of a disk unit according to the first embodiment of the present invention, and FIG. 1B is a side view of the disk unit depicted in FIG. 1A.

Figure 1B:
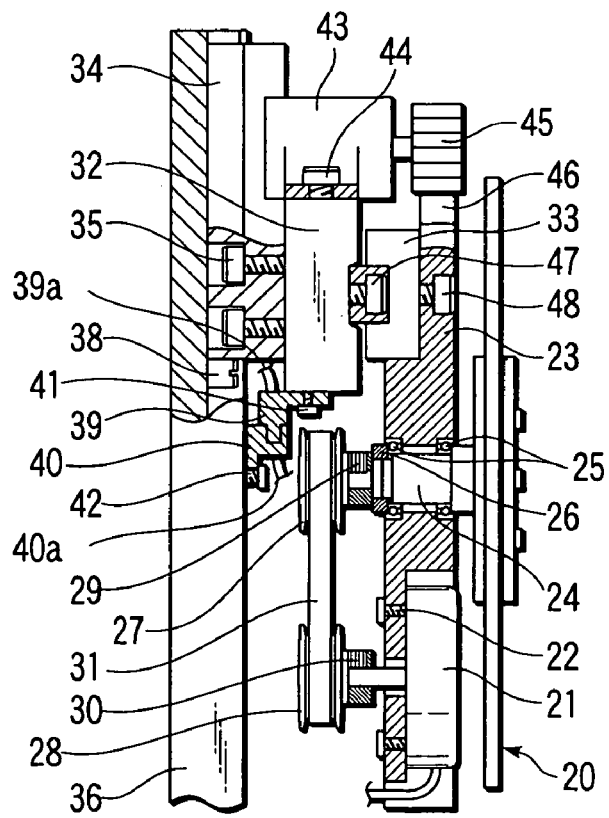
FIG. 1B is a side view of the disk unit depicted in FIG. 1A.

As shown in FIG. 1B, a motor 21, which is for rotating a rotary disk 20, is fixed to a holding member 23 by fixing screws 22. Rotary shaft 24 of the rotary disk 20 is also fixed to the holding member 23 by two bearings 25 and nuts 26. A pulley 27 is fixed to the rotary shaft 24 by a fixing screw 29, and a pulley 28 is fixed to the motor 21 by a fixing screw 30. A belt 31 is wound around the pulley 27 and the pulley 28. Power of the motor 21 is transmitted to the rotary shaft 24 through the belt 31 to rotate the rotary disk 20. The rotary disk 20 is detachably attached to the rotary shaft 24. Its detailed structure will be described later.

The motor 21, rotary shaft 24, pulley 27, pulley 28, belt 31, and others constitute a rotary drive portion, which rotates the rotary disk 20 in a predetermined direction at a predetermined speed. Furthermore, the holding member 23 holds the rotary drive portion and the rotary disk 20.

The holding member 23 is fixed to a direct action guide 33 by fixing screws 48, and the direct action guide 33 is fixed to a fixing member 32 by fixing screws 47, so that the holding member 23 is allowed to move in a direction orthogonal to an optical axis. A switching motor 43 is fixed to the fixing member 32 by fixing screws 44. A gear 45 is attached to the switching motor 43, and the holding member 23 is provided with a rack 46, which meshes with the gear 45. Power of the switching motor 43 is transmitted to the holding member 23 through the gear 45 and the rack 46, to move the holding member 23 in a direction orthogonal to the optical axis. As a result, the rotary disk 20 is inserted into and removed from the optical axis (or the optical path), so that confocal observation and normal observation are switched.

The direct action guide 33, fixing member 32, switching motor 43, gear 45, and rack 46 constitute a drive portion, which inserts into and remove from the optical axis the rotary disk 20.

A dovetail 34 is fixed to the fixing member 32 by fixing screws 35 and, as shown in FIG. 1A, the dovetail 34 is inserted into a dovetail groove 36a provided a microscope main body 36, and detachably fixed to the microscope main body 36 by a fixing screw 37. As shown in FIG. 1B, a positioning pin 38 is attached to the dovetail groove 36a, and a position in a height direction of the entire disk unit is determined with the dovetail 34 being attached.

As apparent from the above description, the disk unit according to this embodiment is constituted by various members attached to the fixing member 32, i.e., the switching motor 43, direct action guide 33, holding member 23, rotary shaft 24, rotary disk 20, motor 21, and others.

In other words, the disk unit comprises the rotary disk 20, the rotary drive portion, which rotates the rotary disk 20, the holding member, which holds the rotary disk 20 and the rotary drive portion, and the drive portion, which is allowed to insert into and remove from the optical axis the rotary disk 20, so that the disk unit is integrally attached to and detached from the microscope main body.

Figure 13:
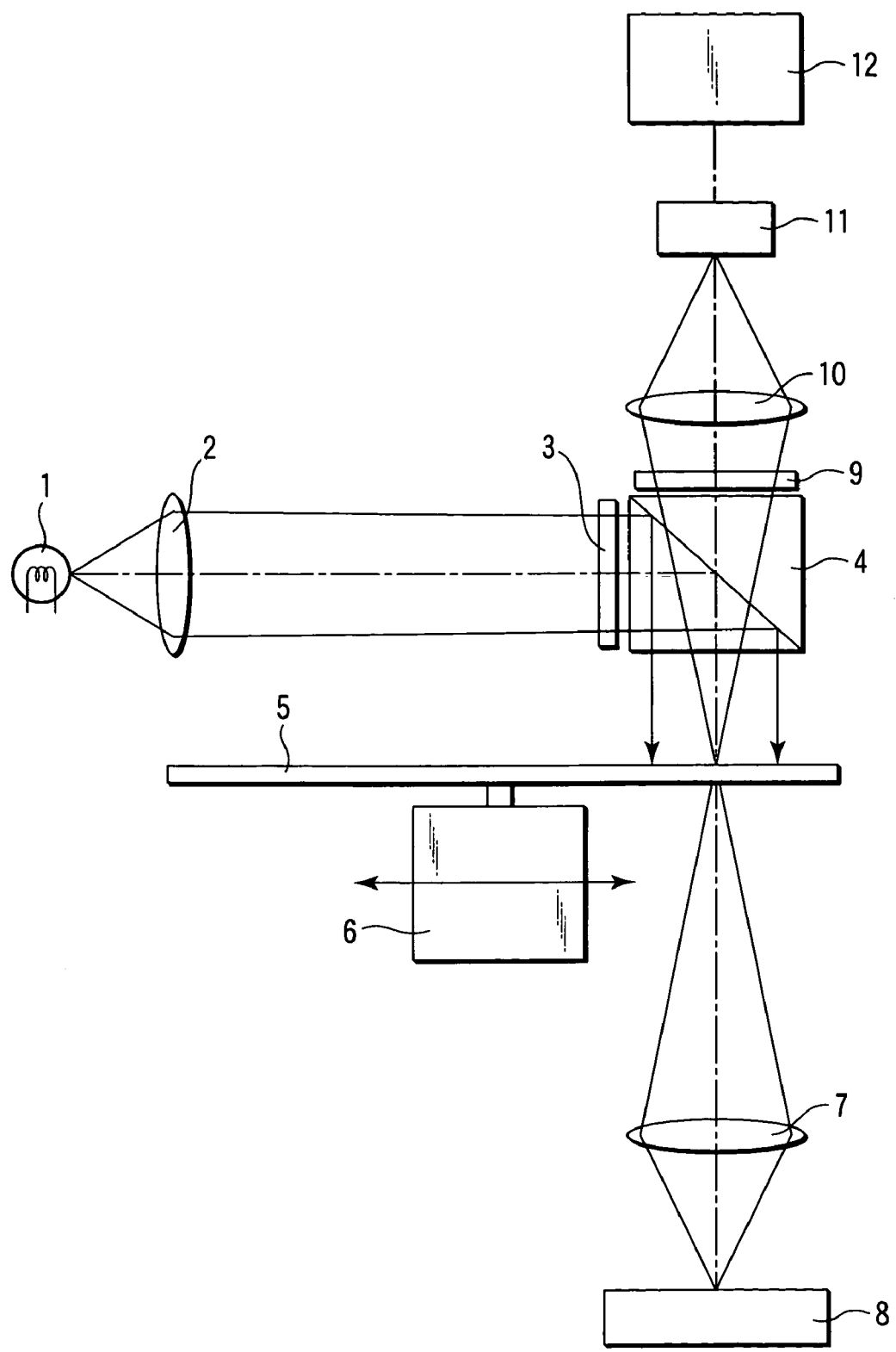
FIG. 13 shows a structure of a conventional example of a disk scanning type confocal microscope.

Moreover, the disk unit according to this embodiment is combined with an optical system shown in FIG. 13 in place of the rotary disk 5 and the motor 6 depicted in FIG. 13, to constitute a confocal microscope.

In other words, the confocal microscope including the disk unit according to this embodiment comprises the disk unit including the rotary disk 20, an illumination optical system comprising the light source 1, lens 2, excitation filter 3, dichroic mirror 4, and objective lens 7, an image formation optical system constituted of the objective lens 7, dichroic mirror 4, absorption filter 9, and image formation lens 10, and the CCD camera 11 as an imaging device, which images a confocal image formed by the image formation optical system, as can be readily imaged from a combination of FIG. 1A, FIG. 1B and FIG. 13. The rotary disk 20, which has confocal openings, is located at an intermediate image position conjugate with a sample surface. The illumination optical system applies illumination light to a sample 8 through the confocal openings of the rotary disk 20. The image formation optical system focuses light such as fluorescence from the sample 8 through the confocal openings of the rotary disk.

A connector 39 is attached to the fixing member 32 by a fixing screw 41, and a connector 40 is attached to the microscope main body 36 by a fixing screw 42. Positions of the connector 39 and the connector 40 are adjusted so that they are electrically conducted when the disk unit is correctly attached to the microscope main body 36. The connector 39 is wire-connected with the motor 21 and the switching motor 43 through a cable 39*a*. Further, the connector 40 is wire-connected with a control circuit or controller, not shown, through a cable 40*a*.

In a state that the disk unit is correctly attached to the microscope main body 36, the motor 21 and the switching motor 43 are electrically connected with the non-illustrated control circuit or controller, and controlled by them. For example, when the switching motor 43 is rotated by a predetermined quantity in a predetermined direction by the non-illustrated control circuit or controller, the rotary disk 20 is inserted into or removed from the optical path. Furthermore, the motor 21 is controlled so that rotation of the rotary disk 20 starts when the rotary disk 20 is inserted into the optical path, and rotation of the rotary disk 20 stops when the rotary disk 20 is removed from the optical path. Of course, start and stop of rotation of the rotary disk 20 do not have to be controlled in cooperation with insertion/removal of the rotary disk 20 into/from the optical path, and they may be arbitrarily controlled irrespective of insertion/removal of the rotary disk 20 into/from the optical path.

Of course, in a state that the disk unit is removed, the connector 39 and the connector 40 are removed, signals are not supplied to electrical components in the disk unit, and no power is supplied.

FIG. 2A is a top view of the disk unit depicted in FIGS. 1A and 1B, showing a state in which the rotary disk is removed. FIG. 2B is a front view of the rotary disk depicted in FIG. 2A.

As shown in FIGS. 2A and 2B, the rotary disk 20 has a disk main body 201 having a pattern surface 201*a* for confocal openings, and a pair of fixing members 202 and 203 provided at a central portion of the disk main body 201. The fixing members 202 and 203 are fixed at the central portion of the disk main body 201 by fixing screws 205 to sandwich the disk main body 201 and a buffering member 204 such as silicon rubber between the fixing members 202 and 203. The fixing member 202 is provided with a female screw 202*a*, whose direction is opposite to the rotation direction of the rotary disk 20, and an end of the rotary shaft 24 is provided with a male screw 24*a*, which meshes with the female screw 202*a*.

The female screw 202*a* of the fixing member 202 and the male screw 24*a* of the rotary shaft 24 constitute a disk attachment structure to removably fix the rotary disk in cooperation with each other. The disk attachment structure constitutes a disk replacement mechanism that allows the rotary disk to be attached to and detached from the rotary drive portion.

The rotary disks 20 are prepared. They are respectively appropriate for objective lenses to be used, and one of the disks 20 is attached to the rotary shaft 24. The rotary disk 20 is fixed to the rotary shaft 24 by screwing the fixing member 202 into the rotary shaft 24 until a contact surface 24*b* on the rotary shaft side comes into contact with a contact surface 202*b* on the disk side. Since directions of the female screw 202*a* of the fixing member 202 and the male screw 24*a* of the rotary shaft 24 are opposite to the rotation direction of the rotary disk 20, the rotary disk 20 does not become loose during rotation.

Here, a distance of the dovetail groove 36*a* of the microscope main body from a dovetail groove surface (= a dovetail surface of the dovetail 34) is adjusted in such a manner that a position of the disk contact surface 24*b* of the rotary shaft 24 becomes an intermediate image position in the optical system (position at which a disk pattern is arranged). Moreover, the contact surface 202*b* formed to the fixing member 202 is positioned at the same level as the pattern surface 201*a* of the confocal openings of the disk main body 201. Therefore, in a state that the rotary disk 20 is fixed to the rotary shaft 24, the pattern surface 201*a* of the confocal openings is positioned on the same level as the contact surface 24*b* of the rotary shaft 24.

In the disk unit according to this embodiment, the rotary disk 20 is replaced as follows. First, the fixing screw 37 is loosen to remove the disk unit from the microscope main body, and the already attached rotary disk 20 is removed. Then, a rotary disk 20 corresponding to (i.e., suitable for) an objective lens to be used is screwed to the rotary shaft 24 until the contact surface 202*b* of the rotary disk 20 is brought into contact with the contact surface 24*b* of the rotary shaft 24, so that the rotary disk 20 is attached to the rotary shaft 24. Subsequently, the disk unit in which the rotary disk 20 has been replaced is inserted into the dovetail groove 36*a* of the microscope main body until it comes into contact with the positioning pin 38, and then fixed to the microscope main body by the fixing screw 37.

By inserting the disk unit until it comes into contact with the positioning pin 38, the connector 39 is coupled with the connector 40, and electrical conduction between the microscope main body and the disk unit is assured. Additionally, when the disk unit is fixed by the fixing screw 37, the pattern surface 201*a* of the rotary disk 20 is automatically positioned at a position corresponding to the intermediate image position in the optical system. In this specification, the description that the pattern surface 201*a* of the rotary disk 20 is positioned at the position corresponding to the intermediate image position in the optical system means that the pattern surface 201*a* of the rotary disk 20 is located on a plane that includes the intermediate image position in the optical system and is orthogonal to the optical axis of the optical system.

According to the disk unit of this embodiment, even if a pattern suitable for an objective lens to be used is required because of replacement of the objective lens or the like, it is possible to easily replace the rotary disk corresponding to (i.e., suitable for) the objective lens to be used without readjusting the optical system. Further, even if a new objective lens is used, manufacturing a rotary disk corresponding to that objective lens enables the other microscope portions to be used with no modification.

Although the above has described the example in which the disk attachment structure to removably fix the rotary disk comprising the female screw 202a of the fixing member 202 and the male screw 24a of the rotary shaft 24, the disk attachment structure, but is not limited to it, may have any other structure.

Figure 3:
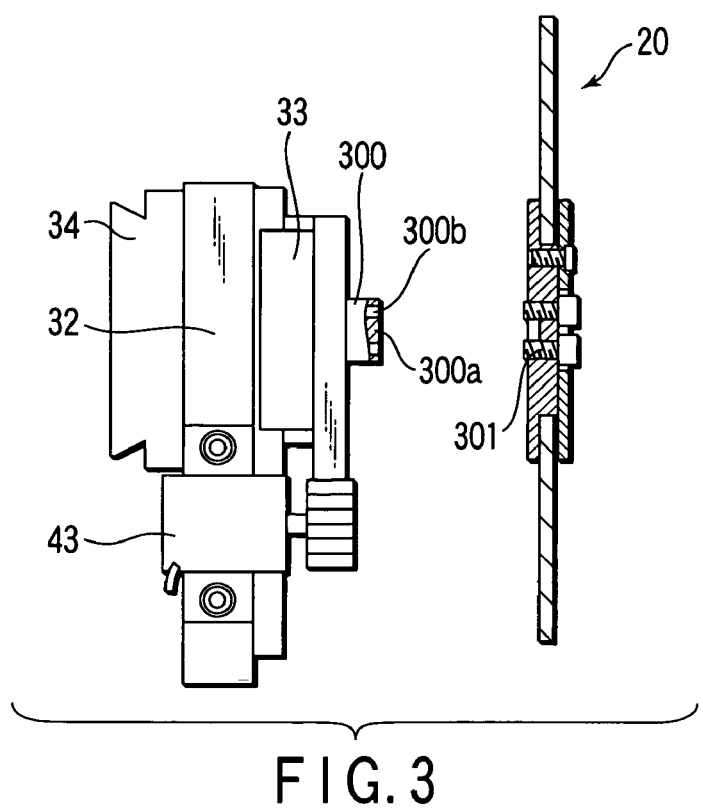
FIG. 3 shows another disk attachment mechanism, which can substitute for a disk attachment mechanism depicted in FIG. 2A.

For example, as shown in FIG. 3, attachment taps 300b may be provided on the contact surface 300a of the rotary shaft 300 as a substitute for the rotary shaft 24, and the rotary disk 20 may be fixed to the rotary shaft 300 by fixing screws 301, which respectively match with the attachment taps 300b. In other words, the disk attachment structure may comprise the attachment tap 300b provided to the rotary shaft 300 and the fixing screws 301, which match with the attachment taps 300b.

Figure 4:
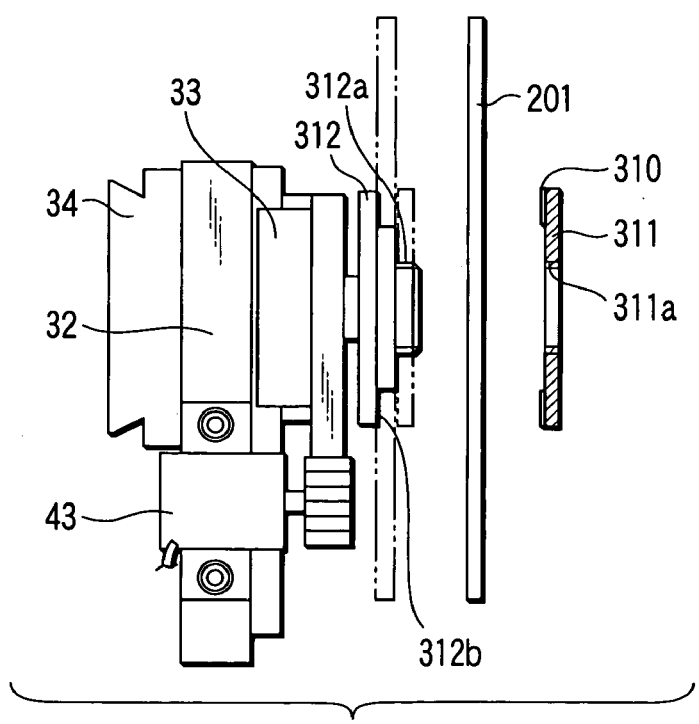
FIG. 4 shows still another disk attachment mechanism, which can substitute for the disk attachment mechanism depicted in FIG. 2A.

Alternatively, although attention must be given to handling of the disk main body 201, the disk body 201 may be fixed by directly interleaving the disk main body 201 between a contact surface 312b of a rotary shaft 312 and a buffering member 310 attached to a fixing member 311 by the rotary shaft 312 having a male screw 312a and the fixing member 311 having a female screw 311a matching with the male screw 312a of the rotary shaft 312, as shown in FIG. 4. In other words, the disk attachment structure may comprise the male screw 312a provided to the rotary shaft 312 and the fixing member 311 having the female screw 311a matching with the male screw 312a. In this structure, the member to be replaced is the disk main body, so that the number of its fixing members can be reduced.

Any other technique (or structure) can be readily applied if the contact surface of the rotary shaft can be matched with the contact surface of the rotary disk.

Furthermore, in the above-described structure, the rotary shaft 24 to which the rotary disk 20 is attached is prepared separately from the motor 21, and the power of the motor 21 is transmitted to the rotary shaft 24 by the belt 31. However, this structure can be of course substituted with a structure in which the motor 21 is directly connected with the rotary shaft 24.

Moreover, although the contact surface 24b of the rotary shaft 24 is positioned on the same level as the pattern surface 201a of the rotary disk 20 in the above-described structure, the pattern surface 201a of the rotary disk 20 may be located at a position deviating from the contact surface 24b of the rotary shaft 24 as long as it is finally located at a position corresponding to the intermediate image position in the optical system.

Second Embodiment

This embodiment is directed to another disk unit of the confocal microscope. In more detail, it is directed to a disk unit that enables replacement of the rotary disk without being removed from and then attached to the microscope main body.

Figure 5:
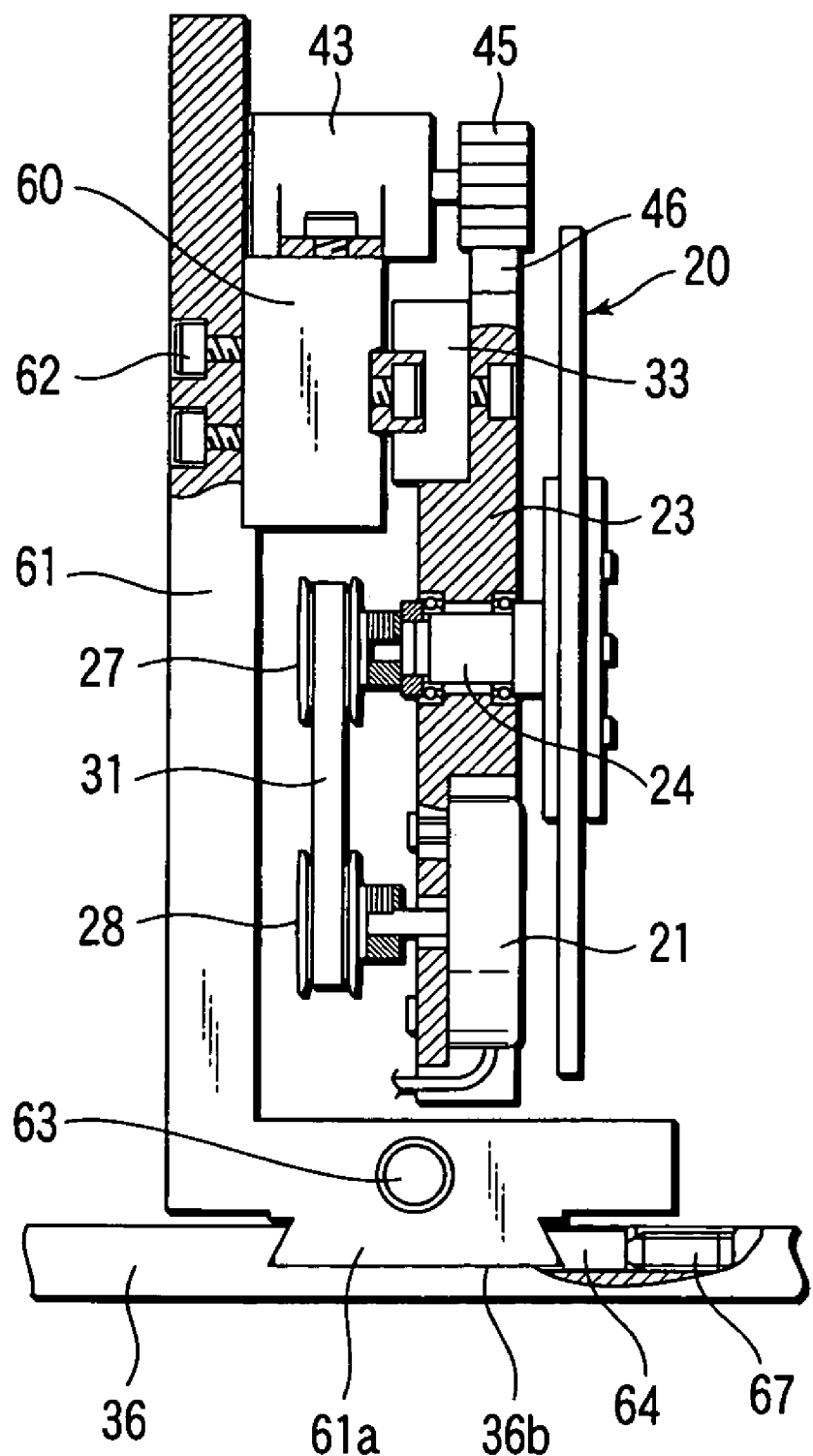
FIG. 5 is a side view of a disk unit according to a second embodiment of the present invention.

FIG. 5 is a side view of a disk unit according to the second embodiment of the present invention. In FIG. 5, members denoted by the same reference numerals as those designating the members shown in FIGS. 1 and 2 are like members, and their detailed explanation will be omitted.

As shown in FIG. 5, a holding member 23 includes a mechanism to rotate a rotary disk 20, and the holding member 23 is movably attached to a fixing member 60 through a direct action guide 33. The fixing member 60 is fixed to a moving member 61 by fixing screws 62. A dovetail 61a is provided to the moving member 61, and a dovetail groove 36b is provided to a microscope main body 36. The dovetail 61a of the moving member 61 engages with the dovetail groove 36b of the microscope main body 36, so that the moving member 61 can move along the dovetail groove 36b with respect to the microscope main body 36. The moving member 61 can be fixed to the microscope main body 36 by a dovetail fixing member 64 and a fixing screw 67.

The moving member 61 is provided with a knob 63 for moving the moving member 61 by manual operation. By pushing or pulling the knob 63 attached to the moving member 61 along the dovetail by hand, the disk unit is moved. The disk unit according to this embodiment comprises all members supported by the moving member 61. This disk unit is combined with an optical system shown in FIG. 13 in place of the rotary disk 5 and the motor 6 depicted in FIG. 13 to constitute a confocal microscope like the first embodiment.

In other words, in this embodiment, the disk unit is attached to the microscope main body 36 through a movement mechanism, which comprises the dovetail 61a of the moving member 61 and the dovetail groove 36b of the microscope main body 36, and allows the disk unit to move between the inside and outside of the microscope main body 36. As a result, the disk unit can integrally move between the inside and the outside of the microscope 36.

Figure 6:
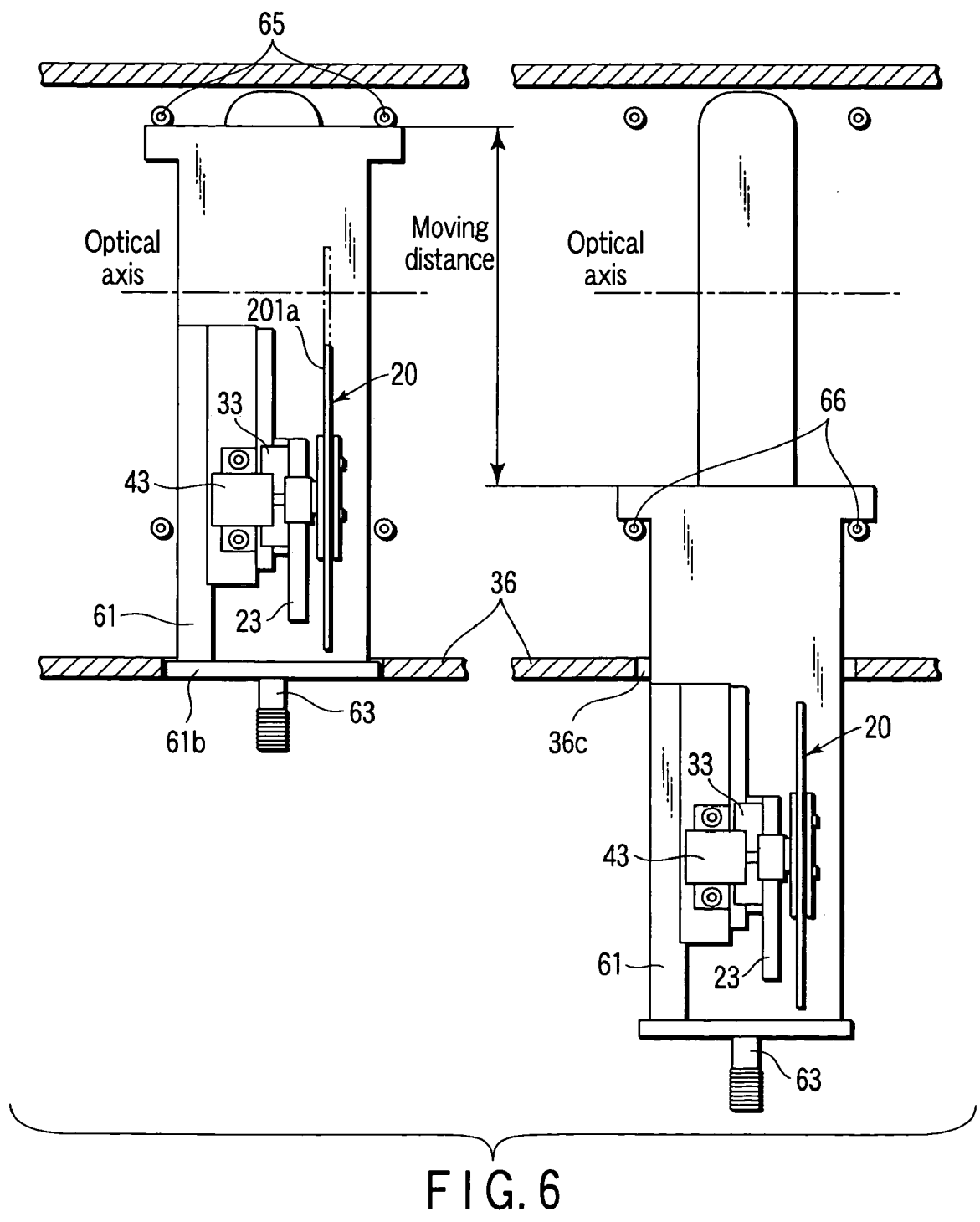
FIG. 6 shows a state of movement of a moving member depicted in FIG. 5, in which a state in which the disk unit is positioned in a microscope main body is shown on the left-hand side and a state in which the disk unit is drawn to the outside of the microscope main body is shown on the right-hand side.

FIG. 6 shows how the moving member depicted in FIG. 5 moves, and a state in which the disk unit is positioned in the microscope main body is shown on the left-hand side whilst a state in which the disk unit is pulled to the outside of the microscope main body is illustrated on the right-hand side.

As shown in FIG. 6, the microscope main body 36 has an opening 36c through which the disk unit (i.e., members supported by the moving member 61) can pass. Additionally, the moving member 61 is provided with a cover portion 61b, which closes the opening 36c of the microscope main body 36 in an observation state, i.e., a state in which the disk unit is positioned in the microscope main body 36.

Further, the microscope main body 36 is provided with a positioning member 65, which comes into contact with the moving member 61 and restricts movement of the moving member 61 when inserting the moving member 61 into the microscope 36, and a positioning member 66, which comes into contact with the moving member 61 and restricts movement of the moving member 61 when pulling the moving member 61 out of the microscope main body 36.

At the time of observation, the disk unit is located inside the microscope main body 36 as illustrated on the left-hand side of FIG. 6. In particular, in confocal observation, when the switching motor 43 is rotated and the holding member 23 is guided and moved by the direct action guide 33, so that the rotary disk 20 is inserted into a position cutting across the optical axis as indicated by an imaginary line. In this state, the pattern surface 201a of the rotary disk 20 is adjusted to match with the intermediate image position of the optical system.

In the disk unit according to this embodiment, the rotary disk 20 is replaced as follows. First, when the rotary disk 20 is positioned on the optical path, the switching motor 43 is rotated and the holding member 23 is moved by a controller or the like, not shown, to remove the rotary disk 20 from the optical path. Furthermore, rotation of the rotary disk 20 is stopped. Then, the fixing screw 67 is loosened, and the moving member 61 is pulled out by manually operating the knob 63 until the moving member 61 comes into contact with the positioning member 66 as shown on the right-hand side of FIG. 6. As a result, the disk unit is moved to the outside of the microscope main body. Subsequently, the already attached rotary disk 20 is removed, and a rotary disk 20 corresponding to (i.e., suitable for) an objective lens to be used is screwed and attached until it comes into contact like the first embodiment. Then, the moving member 61 is pushed in by manually operating the knob 63 until the moving member 61 is brought into contact with the positioning member 65, and the moving member 61 is fixed by the fixing screw 67 as shown on the left-hand side of FIG. 6. As a result, the disk unit in which the rotary disk 20 has been replaced is located at a position suitable for observation. Moreover, the pattern surface 201a of the rotary disk 20 is positioned at a position corresponding to the intermediate image position in the optical system.

The disk unit according to this embodiment has the advantage of the first embodiment as well as an advantage that the rotary disk can be replaced without removing the disk unit from the microscope main body. Therefore, replacement can be further facilitated, and a time required for replacement can be also shortened.

Although the moving member 61 can be moved by engagement of the dovetail and the dovetail groove in the above-described structure, it may be guided by the direct action guide or the like. Moreover, although the moving member 61 is moved by a manual operation of the knob 63, it may be moved by an electrically driven movement mechanism or the like.

Third Embodiment

This embodiment is directed to another disk unit of the confocal microscope. In more detail, this embodiment is directed to a disk unit that further facilitates replacement of the rotary disk by replacing the rotary disk in a conformation that it is accommodated in a cartridge, in order words, by adopting a cartridge type rotary disk.

Figure 7C:
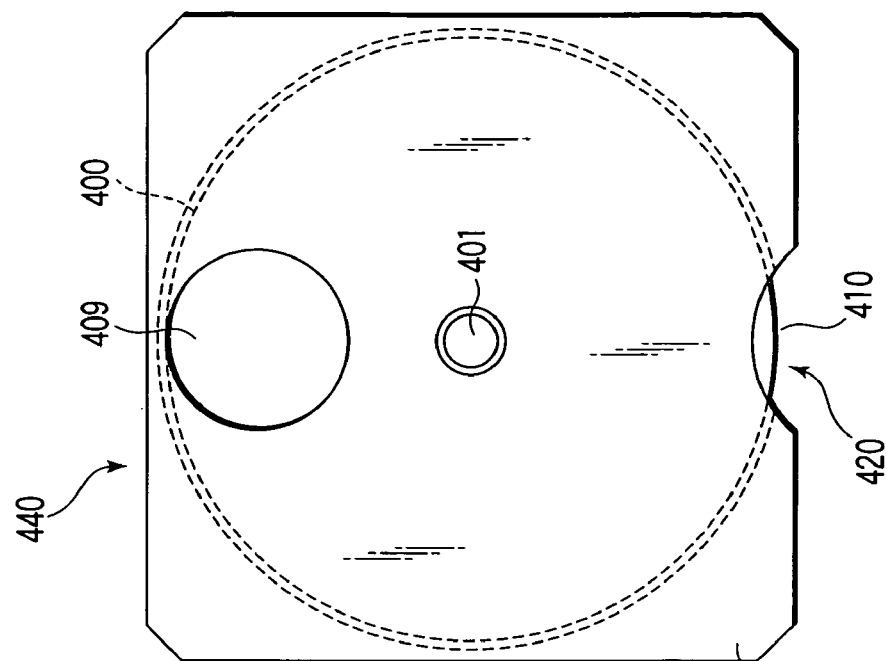
FIG. 7C is a plan view of a counter side of the disk cartridge depicted in FIG. 7A.
Figure 7B:
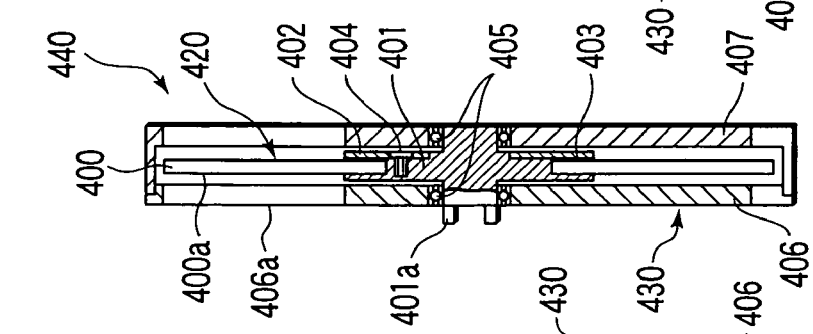
FIG. 7B is a vertical cross-sectional view of the disk cartridge depicted in FIG. 7A.
Figure 7A:
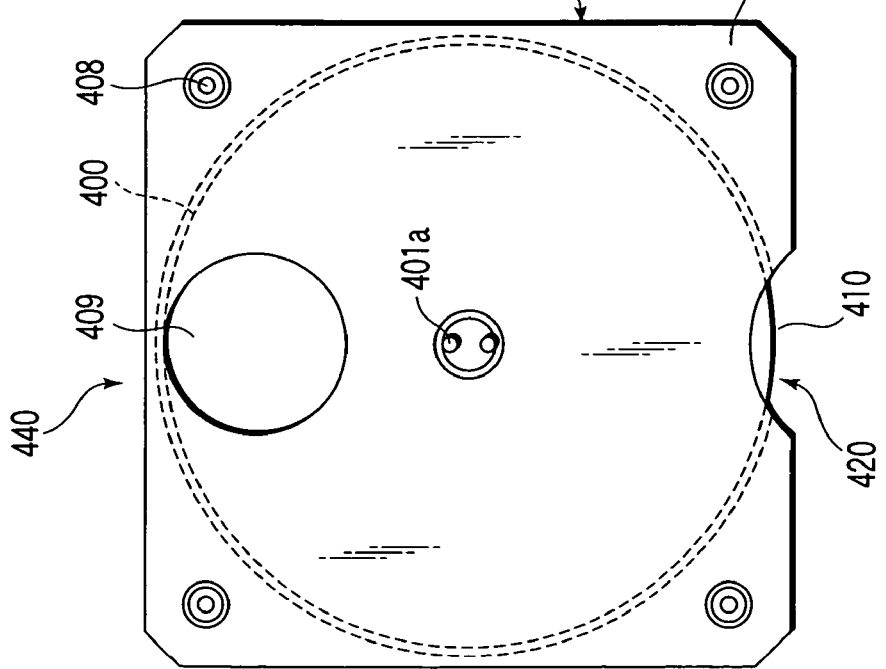
FIG. 7A is a plan view of a disk cartridge in a disk unit according to a third embodiment of the present invention.

FIG. 7A is a plan view of a cartridge type rotary disk (which will be referred to as a "disk cartridge" hereinafter) in a disk unit according to the third embodiment of the present invention. FIG. 7B is a vertical cross-sectional view of the disk cartridge depicted in FIG. 7A. FIG. 7C is a plan view showing a counter side of the disk cartridge depicted in FIG. 7A.

As shown in FIGS. 7A, 7B and 7C, a disk cartridge 440 comprises a rotary disk 420 and a cartridge 430, which accommodates the rotary disk 420. The rotary disk 420 has a disk main body 400 having a pattern surface 400a of confocal openings and a pair of fixing members 401 and 402 provided at a central portion of the disk main body 400. The fixing members 401 and 402 are fixed at the central portion of the disk main body 400 by fixing screws 404 so that the fixing members 401 and 402 sandwich the disk main body 400 and a buffering member 403 such as silicon rubber.

The cartridge 430 comprises two outer frames 406 and 407. The outer frames 406 and 407 are fixed with each other by fixing screws 408 to form a space to accommodate the rotary disk 420 between them. The rotary disk 420 is accommodated in the space between the outer frames 406 and 407. The fixing member 401 is supported by the outer frames 406 and 407 through two bearings 405. As a result, the rotary disk 420 is rotatably supported in the cartridge 430.

An outer surface 406a of the outer frame 406 functions as a contact surface. The pattern surface 400a of the disk main body 400 is positioned away from the outer surface 406a of the outer frame 406 by a predetermined surface. Further, the fixing member 401 has claws 401a for transmitting turning power from the outside. The claws 401a protrudes toward the outside from the outer surface 406a of the outer frame 406.

Each of the outer frames 406 and 407 has an opening portion 409 at a corresponding position. The opening portions 409 of the cartridge 430 partially expose the disk main body 400 of the rotary disk 420. The opening portions 490 are located on the optical path, so that the disk main body 400 is exposed on the optical path. Further, each of the outer frames 406 and 407 has a notch portion 410 at a corresponding position. The notch portion 410 of the cartridge 430 allows a rim portion of the rotary disk 420 to be touched.

FIG. 8A is a side view of the disk unit for the disk cartridge depicted in FIGS. 7A, 7B and 7C, and FIG. 8B is a front view of the disk unit shown in FIG. 8A. In FIGS. 8A and 8B, members denoted by the same reference numerals as those designating the members shown in FIGS. 1A and 1B are like members, such that their detailed explanation will be omitted.

As shown in FIGS. 8A and 8B, a column support member 71 is attached to the microscope main body 36 by fixing screws 73. A fixing member 70 is fixed to the column support member 71 by fixing screws 72. The fixing member 70 movably supports the holding member 75 through a direct action guide 33. The holding member 75 is allowed to move by a switching motor 43.

A rotary shaft 74 is rotatably provided to the holding member 75. A pulley 27 is attached to the rotary shaft 74. The pulley 27 is connected with a pulley 28 attached to a motor 21 through a belt 31 like the first embodiment. The rotary shaft 74 is rotated by the motor 21. The rotary shaft 74 has no contact surface, but is provided with claws 74a for turning power transmission.

In this embodiment, the motor 21, pulley 27, pulley 28, belt 31, and rotary shaft 74 constitute a rotary drive portion, which rotates the disk 420, and the holding member 75 holds the rotary drive portion and the rotary disk 420.

The holding member 75 is provided with a guide portion 75a, which guides the disk cartridge 440. The holding member 75 has a contact surface 75b, and the pattern surface 400a is adjusted to match with the intermediate image position of the optical system when the disk main body 400 is inserted into the optical path with the outer surface 406a of the disk cartridge 440 being matched with the contact surface 75b. Moreover, a suppressing member 77 is attached to the holding member 75 by fixing screws 78. The suppressing member 77 has spring members 76 for matching the disk cartridge 440 with the contact surface 75b. An opening portion 75c is formed to the holding member in such a manner that the optical path is assured with the disk being inserted into the optical path. Additionally, the microscope main body 36 is provided with an opening portion 36d for cartridge insertion. The holding member 75 is provided with a protrusion 75d for positioning in a cartridge insertion direction.

Figure 9:
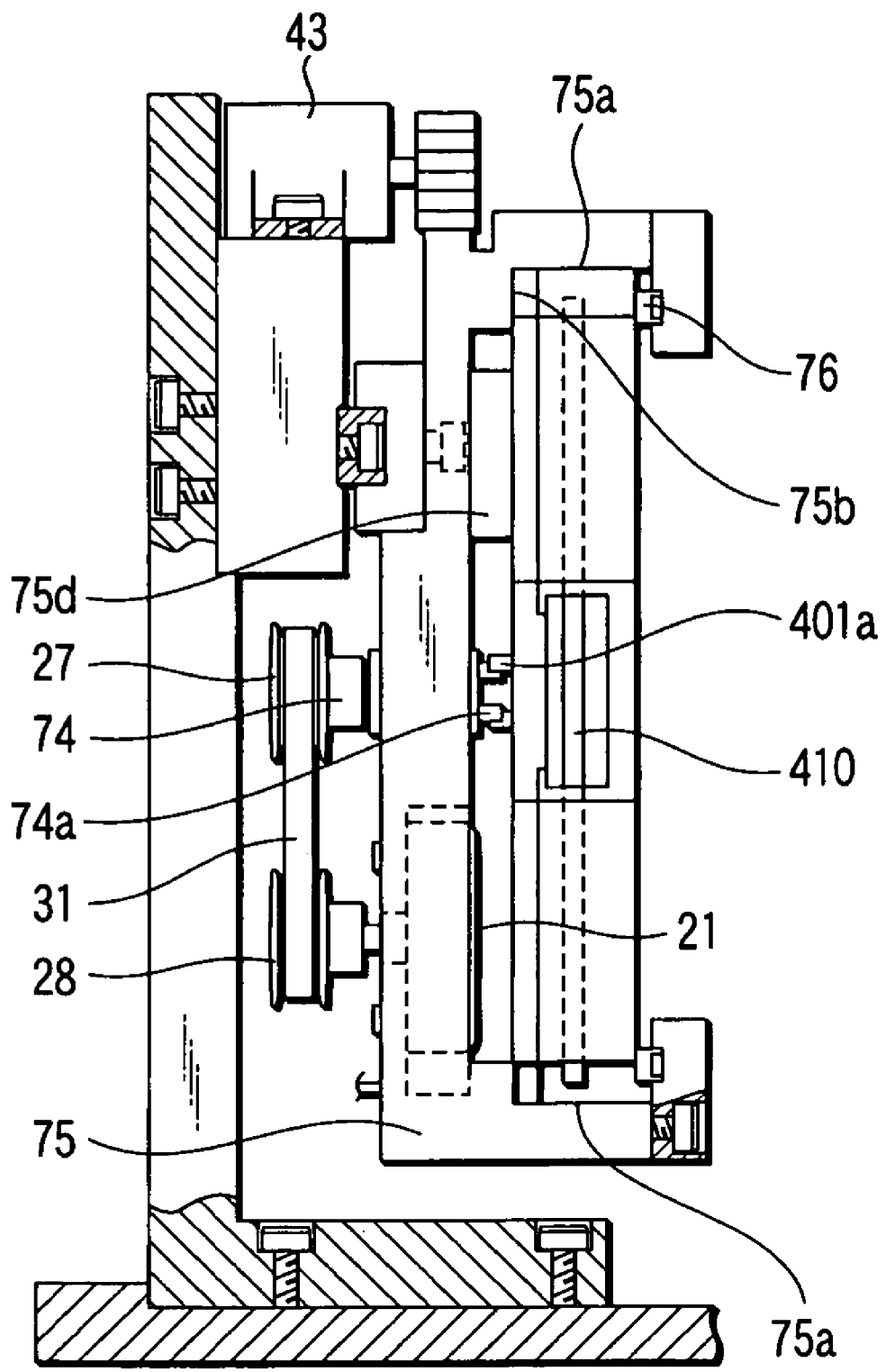
FIG. 9 shows a state in which the disk cartridge depicted in FIGS. 7A, 7B and 7C is attached to the disk unit illustrated in FIGS. 8A and 8B.

FIG. 9 shows a state in which the disk cartridge depicted in FIGS. 7A, 7B and 7C is attached in the disk unit illustrated in FIGS. 8A and 8B.

As shown in FIG. 9, the disk cartridge 440 is guided by the guide portion 75a of the holding member 75 and inserted until it comes into contact with the positioning protrusion 75d, so that the disk cartridge 440 is loaded in the disk unit. In this state, the claws 74a of the rotary shaft 74 engage with claws 401a of the fixing member 401 of the disk cartridge 440. As a result, rotation of the rotary shaft 74 turns the rotary disk 420 in the disk cartridge 440. Further, the outer surface 406a of the disk cartridge 440 is pressed against the contact surface 75b of the holding member 75 by the spring members 76. As a result, the pattern surface 400a of the rotary disk 420 in the disk cartridge 440 is positioned at a position corresponding to the intermediate image position in the optical system.

In the disk unit according to this embodiment, replacement of the disk cartridge 440 is performed as follows. First, when the rotary disk 420 is positioned on the optical path, the switching motor 43 is rotated to move the holding member 75 by a controller or the like, not shown, to remove the rotary disk 420 from the optical path, and rotation of the rotary disk 420 is stopped. Then, the already inserted disk cartridge 440 is removed. Subsequently, a disk cartridge 440 corresponding to (i.e., suitable for) an objective lens to be used is inserted into the guide portion 75a of the holding member 75 and pushed in until it comes into contact with the protrusion 75d.

When the claws 74a of the rotary shaft 74 and the claws 401a of the fixing member 401 hit against the disk cartridge 440 and obstruct removal or insertion at the time of removal or insertion of the disk cartridge 440, it is sufficient to touch the rim portion of the rotary disk 420 from the notch portions 410 by a hand and slightly rotate the rotary disk 420.

In this embodiment, the disk cartridge and a mechanism (the outer surface 406a of the disk cartridge 440 and the contact surface 75b of the holding member 75), which positions the disk cartridge, constitute a disk replacement mechanism, which allows the rotary disk to be attached to and detached from the rotary drive portion.

The disk unit according to this embodiment has the advantage of the second embodiment as well as an advantage that the rotary disk can be replaced by only a simple operation to remove and insert the disk cartridge. As a result, a further reduction in time required for replacement can be expected. Furthermore, since the rotary disk is accommodated in the cartridge, handling of the rotary disk can be further facilitated.

Although engagement of the claws is utilized for transmission of the turning power in the above-described structure, the mechanism that transmits the turning power is not limited to it, and any other transmission mechanism, e.g., a transmission mechanism using a gear, may be utilized.

Fourth Embodiment

This embodiment is directed to a disk unit switching device that enables selection of a rotary disk required for a microscopic observation from disk units. In more detail, this embodiment is directed to a disk unit switching device comprising disk units described in conjunction with the first to third embodiments, and a switching mechanism that switches the disk units to apply one of the disk units to the confocal microscope.

Figure 10:
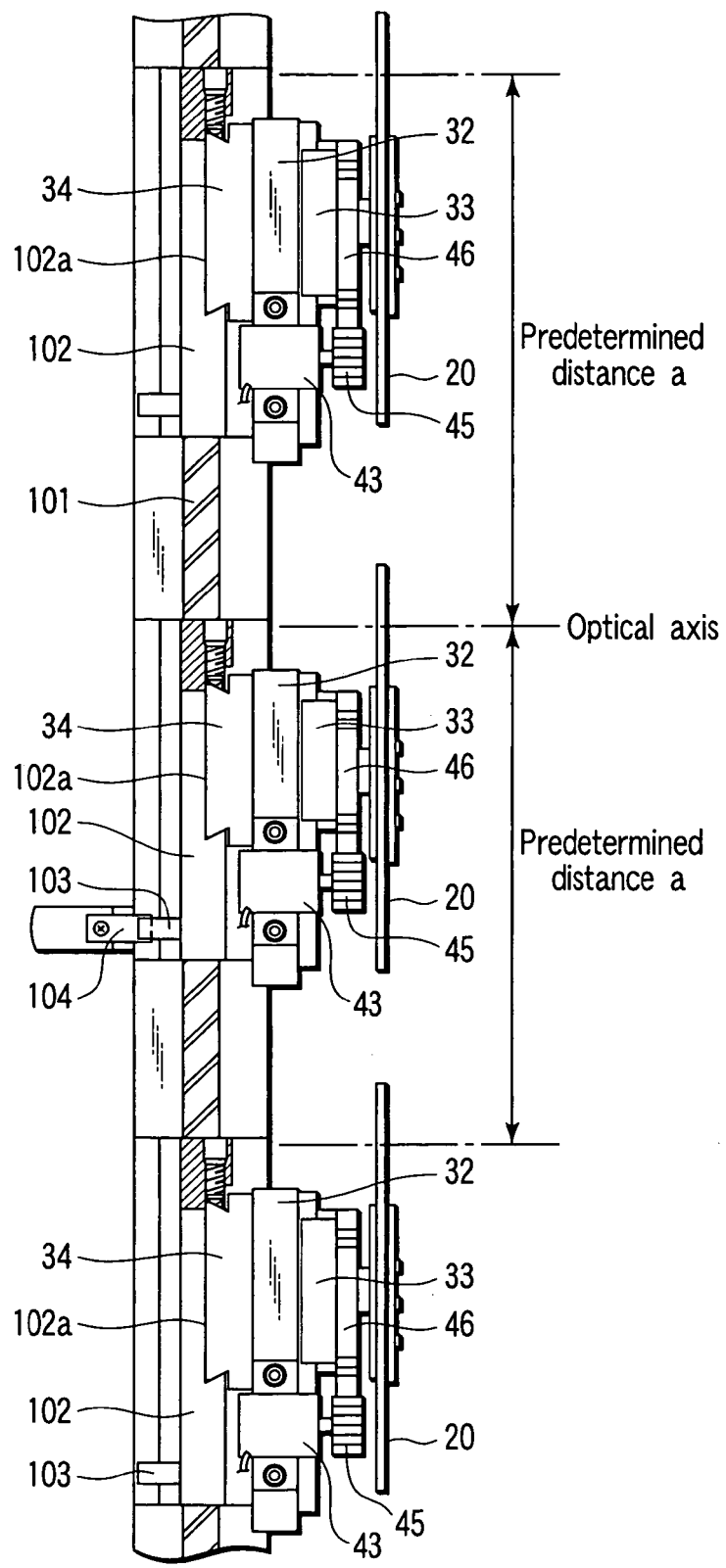
FIG. 10 is a top view of a disk unit switching device according to a fourth embodiment of the present invention.
Figure 11A:
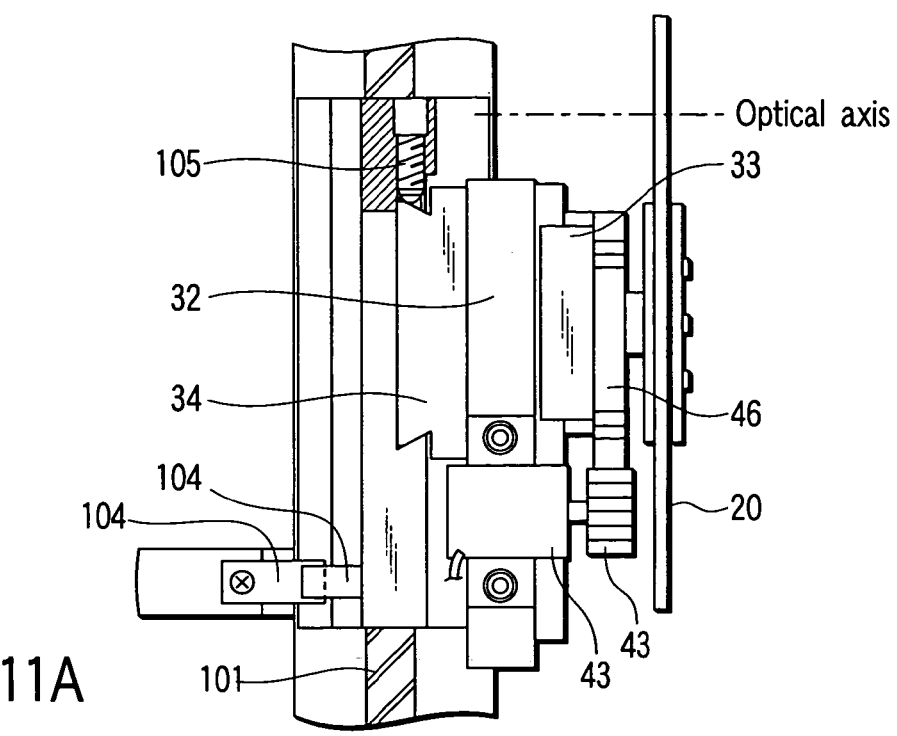
FIG. 11A is a top view of a part of the disk unit switching device depicted in FIG. 10 corresponding to one disk unit.
Figure 11B:
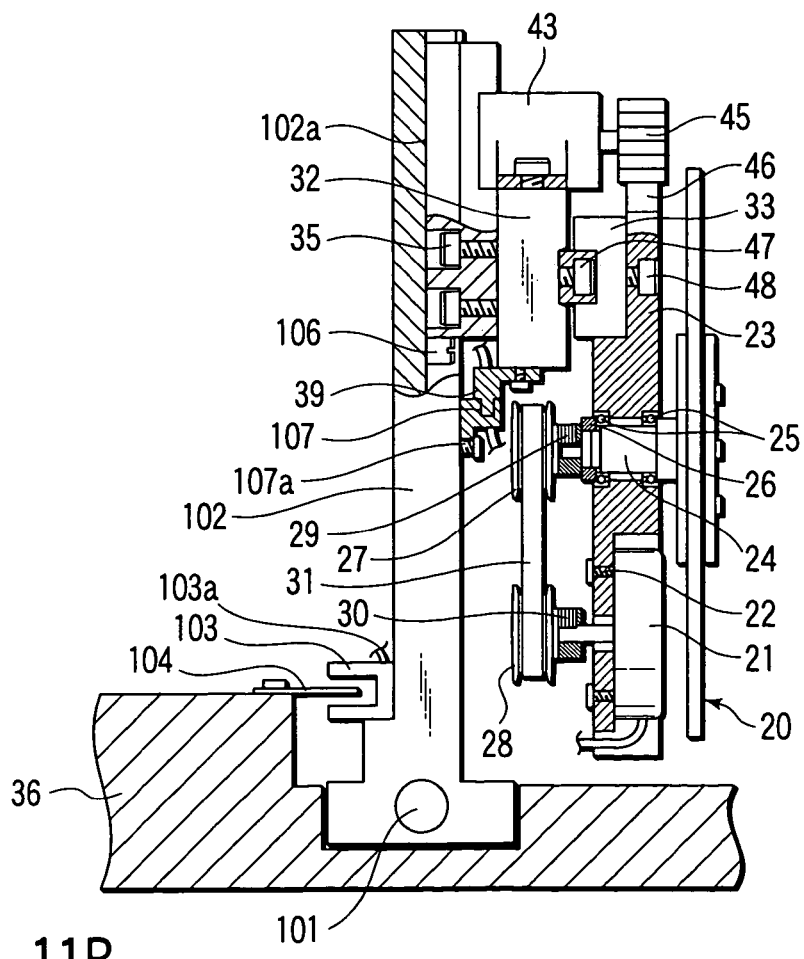
FIG. 11B is a side view of the disk unit switching device depicted in FIG. 11A.

FIG. 10 is a top view of a disk unit switching device according to the fourth embodiment of the present invention. FIG. 11A is a top view showing a part corresponding to one disk unit in the disk unit switching device depicted in FIG. 10. FIG. 11B is a side view of the disk unit switching device depicted in FIG. 11A. This embodiment is a disk unit switching device including the disk unit according to the first embodiment and, as shown in FIGS. 10, 11A and 11B, members denoted by the same reference numerals designating the members illustrated in FIGS. 1A and 1B are like members, thereby eliminating their detailed explanation.

As shown in FIGS. 10, 11A and 11B, a ball screw 101 is set to a microscope main body 36 in such a manner that it cuts across the optical axis, and a plurality of, e.g., three moving bases 102 are arranged on the ball screw at predetermined gaps. The ball screw 101 is rotated by a control circuit and a drive motor, which are not illustrated, and rotation of the ball screw 101 moves the moving bases 102 in a direction crossing the optical axis without restraint. A recognition sensor 103 is attached to each moving base 102, and a blade 104 is attached to the microscope main body 36 so as to cross the recognition sensor 103. Furthermore, each dovetail 34 of the disk unit is inserted into a dovetail groove portion 102a provided to each moving base 102, and detachably fixed to each moving base 102 by each fixing screw 105. A positioning pin 106 is attached to the female portion 102a, and a position in a height direction of the entire disk unit is determined with the dovetail 34 being engaged.

Moreover, the fixing member 32 and the moving base 102 have a connector 39 and a connector 107, respectively. Positions of the connector 39 and the connector 107 are adjusted to achieve electrical conduction in a state that the disk unit is being attached. The connector 107 and the recognition sensor 103 of each moving base 102 are wire-connected with a control circuit, not shown, through a cable 107a and a cable 103a.

A positional relationship between each moving base and the disk unit will now be described. A disk unit that is currently in the optical path is confirmed based on the recognition sensor 103 that the blade 104 crosses. The non-illustrated control circuit performs various kinds of controls such as rotation of the rotary disk 20 and insertion/removal of the rotary disk 20 into/from the optical path with respect to only the currently effective disk unit. When changing the rotary disk 20 to a counterpart existing on another moving base 102, the ball screw 101 is arbitrarily rotated in a forward or reverse direction by, e.g., the non-illustrated control circuit or controller and it is moved until the blade 104 crosses the recognition sensor 103 of a target moving base 102. As a result, the disk unit is switched to the counterpart to be applied to the confocal microscope, and the rotary disk 20 is replaced. At this time, a position of the ball screw 101 or the moving base 102 is adjusted at a position where the rotary disk 20 is inserted into the optical path in such a manner that the intermediate image position in the optical system matches with the pattern surface of the rotary disk 20.

When the operation to change the rotary disk is performed by the non-illustrated controller or the like, the moving base 102 moves by a predetermined distance a or 2a, an arbitrary disk is inserted into the optical path, and the intermediate image position in the optical system matches with the pattern surface of the rotary disk 20.

When a disk other than the selectable and changeable three rotary disks is required, the rotary disk on the disk unit is replaced. The disk replacement with respect to the disk unit and attachment/removal of the disk unit to/from the moving base 102 are the same as those in the first embodiment.

FIG. 12 schematically shows a structure of the confocal microscope including the disk unit switching device according to this embodiment. FIG. 12 shows an example of the confocal microscope that can switch two disk units. Moreover, in FIG. 12, members denoted by the same reference numerals designating those depicted in FIG. 13 are like members.

The confocal microscope illustrated in FIG. 12 comprises a disk unit switching device 110, which can switch two disk units 100A and 100B, two objective lenses 7A and 7B, a motorized revolver 111, which switches the two objective lenses 7A and 7B, and a control device 112, which controls the disk unit switching device 110 in accordance with switching the objective lenses 7A and 7B by use of the motorized revolver 111.

According to this embodiment, the disk unit switching device can easily change a rotary disk by switching the disk units and selecting a corresponding rotary disk without readjusting the optical system even if a pattern suitable for a replaced objective lens is required due to replacement of the objective lens. Therefore, the confocal microscope can perform the further efficient observation. Additionally, even if there is no corresponding rotary disk, it is possible to easily cope with changing the rotary disk by replacing the rotary disk in the disk unit without readjusting the optical system.

Further, even if a new objective lens is used, manufacturing a corresponding disk can suffice, and the other microscope portions can be used with no modification.

Although the disk unit switching device according to this embodiment has a structure including the disk unit according to the first embodiment, it may of course have a structure including the disk unit according to the second embodiment or the third embodiment. Furthermore, although the disk unit switching device according to this embodiment moves the moving base 102 by a direct action mechanism using the ball screw 101, the drive portion that moves the moving base 102, but is not limited to it, may use, e.g., a rotary mechanism. Moreover, each moving base may be electrically or manually driven.

Additionally, various kinds of modifications, which substitute a movement control over each moving base for a rotary disk insertion/removal control with respect to the optical path, for example, may be easily applied.

Further, the disk unit switching device may comprise a moving base, a disk unit, and a carriage mechanism that can store rotary disks and attach an arbitrary rotary disk in these disks to the disk unit instead of comprising moving bases and disk units. According to this structure, the same advantages as those of this embodiment can be realized while further suppressing a cost.

Each of the first to fourth embodiments described above may be applied irrespective of whether the microscope main body is an upright microscope or an inverted microscope in the disk scanning type confocal microscope and whether it is a retrofit unit having a built-in confocal optical system.

Although the above has described the embodiments according to the present invention with reference to the accompanying drawings, the present invention is not restricted to these embodiments, and various modifications or changes may be applied without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A confocal microscope comprising:
    an independent disk unit, which includes: a rotary disk, having many confocal openings, which is located at a position conjugate with a sample surface and is rotated to scan a specimen, a rotary drive portion, which rotates the rotary disk, a holding member, which holds the rotary disk and the rotary drive portion, a drive portion, which is operable to insert the rotary disk into and to remove the rotary disk from an optical axis of the confocal microscope, and a disk replacement mechanism, via which the rotary disk is coupled with the rotary drive portion, such that the rotary disk is removable from the rotary drive portion;
    an illumination optical system, which applies illumination light to a sample through the confocal openings of the rotary disk;
    an image formation optical system, which focuses the light from the sample through the confocal openings of the rotary disk; and
    an imaging device, which images a confocal image formed by the image formation optical system.

2. The confocal microscope according to claim 1, wherein:
    the rotary drive portion comprises a rotary shaft, to which the rotary disk is coupled via the disk replacement mechanism,
    the rotary shaft has a contact surface which is located one of at the position conjugate with the sample surface and at a position a predetermined distance from the position conjugate with the sample surface,
    the rotary disk has a contact surface, which comes into contact with the contact surface of the rotary shaft, and
    the rotary disk is positioned by bringing the contact surface of the rotary disk into contact with the contact surface of the rotary shaft, whereby the rotary disk is determined to be located at the position conjugate with the sample surface.

3. The confocal microscope according to claim 1, wherein the disk unit as a whole is attachable to and detachable from a microscope main body of the confocal microscope, and when the disk is detached from the microscope main body the illumination optical system and the image formation optical system remain in the microscope main body.

4. The confocal microscope according to claim 1, wherein the disk unit as a whole is movable between a position inside the microscope main body and a position at least partially outside of the microscope main body, and the disk unit as a whole is movable with respect to the optical axis.

5. The confocal microscope according to claim 1, wherein the disk replacement mechanism comprises a cartridge which accommodates the rotary disk and which is removably positioned in the disk unit together with the rotary disk to couple the rotary disk to the rotary drive portion.

6. The confocal microscope according to claim 1, further comprising a disk unit switching device, which supports a plurality of said disk units, and which switches the disk units to selectively insert the respective rotary disks of the disk units into the optical axis.

7. The confocal microscope according to claim 6, further comprising:
    objective lenses;
    a revolver, which switches the objective lenses; and
    a control device, which controls the disk unit switching device in accordance with switching of the objective lenses by the revolver.

8. An independent disk unit for a confocal microscope, comprising:
    a rotary disk, having many confocal openings, which is rotated to scan a specimen;
    a rotary drive portion, which rotates the rotary disk;
    a holding member, which holds the rotary disk and the rotary drive portion;
    a drive portion, which is operable to insert the rotary disk into and to remove the rotary disk from an optical axis of the confocal microscope; and a disk replacement mechanism, via which the rotary disk is coupled with the rotary drive portion, such that the rotary disk is removable from the rotary drive portion.

9. The disk unit according to claim 8, wherein:

the rotary drive portion comprises a rotary shaft, to which the rotary disk is coupled via the disk replacement mechanism, the rotary shaft has a contact surface which is located one of at a position conjugate with the sample surface and at a position a predetermined distance from the position conjugate with the sample surface, the rotary disk has a contact surface, which comes into contact with the contact surface of the rotary shaft, and the rotary disk is positioned by bringing the contact surface of the rotary disk into contact with the contact surface of the rotary shaft, whereby the rotary disk is determined to be located at the position conjugate with the sample surface.

10. The disk unit according to claim 8, wherein the disk unit as a whole is attachable to and detachable from a microscope main body of the confocal microscope, and when the disk is detached from the microscope main body an illumination optical system and an image formation optical system remain in the microscope main body.

11. The disk unit according to claim 8, wherein the disk unit as a whole is movable between a position inside the microscope main body and a position at least partially outside of the microscope main body, and the disk unit as a whole is movable with respect to the optical axis.

12. The disk unit according to claim 8, wherein the disk replacement mechanism comprises a cartridge which accommodates the rotary disk and which is removably positioned in the disk unit together with the rotary disk to couple the rotary disk to the rotary drive portion.

13. A disk unit switching device for a confocal microscope, comprising:

a plurality of disk units, each of which comprises: a rotary disk, having many confocal openings, that is rotated to scan a specimen, a rotary drive portion, which rotates the rotary disk, a holding member, which holds the rotary disk and the rotary drive portion, a drive portion, which is operable to insert the rotary disk into and to remove the rotary disk from an optical axis of the confocal microscope and a disk replacement mechanism, via which the rotary disk is coupled with the rotary drive portion, such that the rotary disk is removable from the rotary drive portion; and a switching mechanism, which switches the disk units to selectively insert the respective rotary disks of the disk units into the optical axis.

* * * * *